United States Patent [19]

Schmidt et al.

[11] Patent Number: 4,577,140
[45] Date of Patent: Mar. 18, 1986

[54] APPARATUS FOR GUIDING A TRACKLESS VEHICLE

[75] Inventors: Alfred Schmidt, Munich; Gerhard Flachenecker, Ottobrunn, both of Fed. Rep. of Germany

[73] Assignee: M.A.N. Maschinenfabrik Augsburg-Nurnberg AG, Munich, Fed. Rep. of Germany

[21] Appl. No.: 653,984

[22] Filed: Sep. 24, 1984

[30] Foreign Application Priority Data

Oct. 1, 1983 [DE] Fed. Rep. of Germany ....... 3335776

[51] Int. Cl.$^4$ ............................................. B64C 13/18
[52] U.S. Cl. .................................... 318/587; 364/436; 180/168
[58] Field of Search ....................... 318/587, 696, 685; 364/436; 329/50

[56] References Cited

U.S. PATENT DOCUMENTS

| 4,247,896 | 1/1981 | Schnaibel | 318/587 X |
| 4,258,813 | 3/1981 | Rubel | 318/587 X |
| 4,300,020 | 11/1981 | Toyomaki | 329/50 X |

FOREIGN PATENT DOCUMENTS 2137631  1/1973  Fed. Rep. of Germany .

Primary Examiner—William M. Shoop, Jr.
Assistant Examiner—Saul M. Bergmann
Attorney, Agent, or Firm—Alan H. Levine

[57] ABSTRACT

Apparatus for guiding a trackless vehicle along an A.C. conductor marking a roadway, having at least two sensors to detect a magnetic field emanating from the current conductor the output signals of which are routed to interpretive electronics. The interpretive electronics include a phase-locked loop (PPL) the input signal to which is the output signal of one of the sensors, and the output signal of which is used for demodulation, by mixers, of the sensor signals.

11 Claims, 3 Drawing Figures

APPARATUS FOR GUIDING A TRACKLESS VEHICLE

This invention relates to apparatus for guiding a trackless vehicle along an A.C. conductor marking the roadway, the apparatus having at least two sensors, to detect the magnetic field emanating from the current conductor, and interpretive electronics processing the sensor output signals to form steering signals.

Devices of this description are known to exist in various versions. One time-tested system makes use of two sensors to scan a magnetic field generated by a guide cable, one sensor responding to the horizontal, and the other to the vertical, component of the magnetic field. In this arrangement, the quotient of the signals, or voltages, output of the two sensors, $U_v$, $U_h$, is, owing to the relationships $$U_v \sim F_v,\ U_h \sim F_h \text{ and } \frac{F_h}{F_v} = \frac{a}{d}$$

proportional to the horizontal deviation "a" of the sensors from the line conductor.

$F_v$ and $F_h$ are respectively, the vertical and horizontal field components, and "d" is the vertical distance between the sensor and the guide cable.

A device utilizing this response is known from German Pat. No. 21 37 631, where the interpretive electronics contain two selective amplifiers, each being connected to a sensor, which by level control indirectly generate an amplified signal proportional to the quotient $U_h/U_v$. The amplified signals are finally routed to a phase-dependent rectifier to produce a steering signal. Interpretive electronics of this description, however, are capable of interpreting signals only if of a predetermined frequency. The sensors, however, accept a mix of various frequencies derived from diverse information, redundant guide cables, shunts, etc. If for detouring the vehicle, e.g., it is intended to change to another frequency, the known device would require additional components.

In a broad aspect of the present invention, apparatus of this general description is provided to ensure change-frequency, safe control of the vehicle while being of simple construction which is easy to manufacture from a small number of components.

It is a particular object of the present invention to provide an arrangement including a phase-locked loop (PLL), the input to the PLL being the output of one of the sensors, and the output from the PLL being used to demodulate the outputs from the sensors.

Using a sensor signal driven PLL makes possible, in a simple way, generation of a demodulation signal phase-coupled to a frequency contained in the sensor signals, the demodulation signal serving to simultaneously interpret several sensor signals of the same frequency. This reduces the amount of circuitry, especially where several antenna signals are used for controlling the vehicle.

The interpretive electronics of the present invention afford another advantage in that unlike the known device, they eliminate the need for selective filters and can be operated at various frequencies simply by changing the free-running frequency of the PLL.

A further advantage provided by the present interpretive electronics of the present invention is the ability of phase-locked loops to produce a no-noise output signal even at low effective signal level and concurrently high interference level, thus adding to the working range of the interpretive electronics and to their reliability.

For demodulation of the sensor signals, use can be made of simple mixers or demodulators in lieu of high-grade analog multipliers. The signals demodulated in this manner can be processed, using a known method, to produce control signals, such as forming the quotient.

In a further aspect of the present invention, the PLL is fitted with a phase-sensitive detector followed by a control unit to transform the output signal of the phase-sensistive detector into a suitable control voltage for a voltage-controlled oscillator (VCO) of the PLL. The output signal of the oscillator is routed, as a PLL signal, to the phase-sensitive detector, with the PLL signal being phase-shifted through 90° relative to the sensor signal. As a result, the output of the phase-sensitive detector will be a voltage, the mean valve of which is proportional to the frequency or phase difference between the PLL frequency and the sensor signal, which makes it suitable for the adjustment or synchronization of the PLL frequency.

The bandwidth of the PLL can be adjusted within wide ranges via the bandwith of the control unit characteristic, especially using extremely narrow-band filters, to reduce the requisite amount of frequency spacing if, e.g., use is made of guide cables which are fed several frequencies.

A demodulation signal shifted through 90° relative to the PLL signal can be generated in a simple manner if the voltage-controlled oscillator generates a rectangular output signal of $2^n$ times the PLL frequency, with a frequency divider generating the phase-shifted demodulation signal.

In a further aspect of the present invention, the VCO signal is routed to a frequency counter used to monitor the PLL frequency. For this purpose, use can also be made of the PLL signal instead of the VCO signal.

Use of a control unit having an integral portion provides an advantage in that minor differences between the free-running frequency and the sensor signal frequency will be completely eliminated.

For monitoring noninterpreted frequencies contained in the sensor signal, a bandpass filter of fixed or changeable midfrequency plus a rectifier with a threshold detector driven by the output signal of the phase-sensitive detector can be provided in a simple design according to the present invention. This advantageously enables the occurrence of redundant guide cable frequencies to be recognized without unnecessarily adding to the complexity of design.

The electronics design of the present invention is suitable especially for antenna systems where the sensors each scan at least one horizontal and one vertical component of the magnetic field. This enables processing by forming quotients of the sensor signals.

The invention will be further described with reference to the accompanying drawings, in which.

Figure 1:
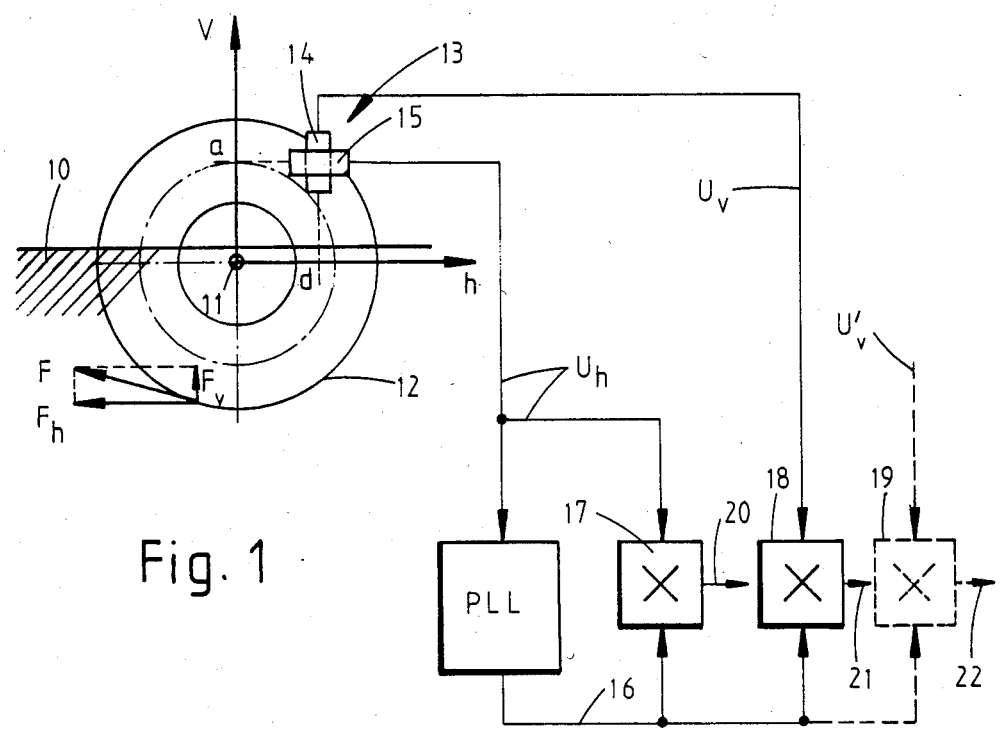
FIG. 1 is a block diagram of a vehicle control arrangement according to the invention, incorporating a phase-locked loop (PLL)

With reference now to FIG. 1, the numeral 10 indicates a roadway in which an A.C. guide cable 11 is arranged to produce a magnetic field 12, the field force F of which can be resolved into orthogonal field components $F_h$ and $F_v$. The magnetic field 12 is scanned by crossed antennas 13 consisting of a first sensor 14, in the form of a vertically arranged coil, and a second sensor 15, in the form of a horizontally arranged coil, each coil serving to scan its respective field component.

The voltage signal $U_h$ of sensor 15, for the horizontal component $F_h$, is routed to a phase-locked loop (PLL) for generating a demodulation signal 16, and is also used for generating control signals.

The resultant demodulation signal 16 can be used to demodulate any number of sensor signals $U_h$, $U_v$, $U_{v'}$ by means of mixers of demodulation circuitry to be used to process the demodulated signals 20 to 22 to form corresponding control signals.

When using a crossed-antennas system shown in FIG. 1, it will be an advantage to use the signal $U_h$ of the horizontal component for generating the demodulation signal 16 to maintain independence of antenna 13 positioning, since the horizontal field component $F_h$ will invariably be a finite value above the roadway 10, whereas the vertical component $F_v$ will become zero on the V axis. In the example here described, sensors 14 and 15 are provided to scan orthogonal field components $F_h$ and $F_v$; the method here described for demodulating sensor signals will nevertheless be applicable also to other antenna systems.

Figure 2:
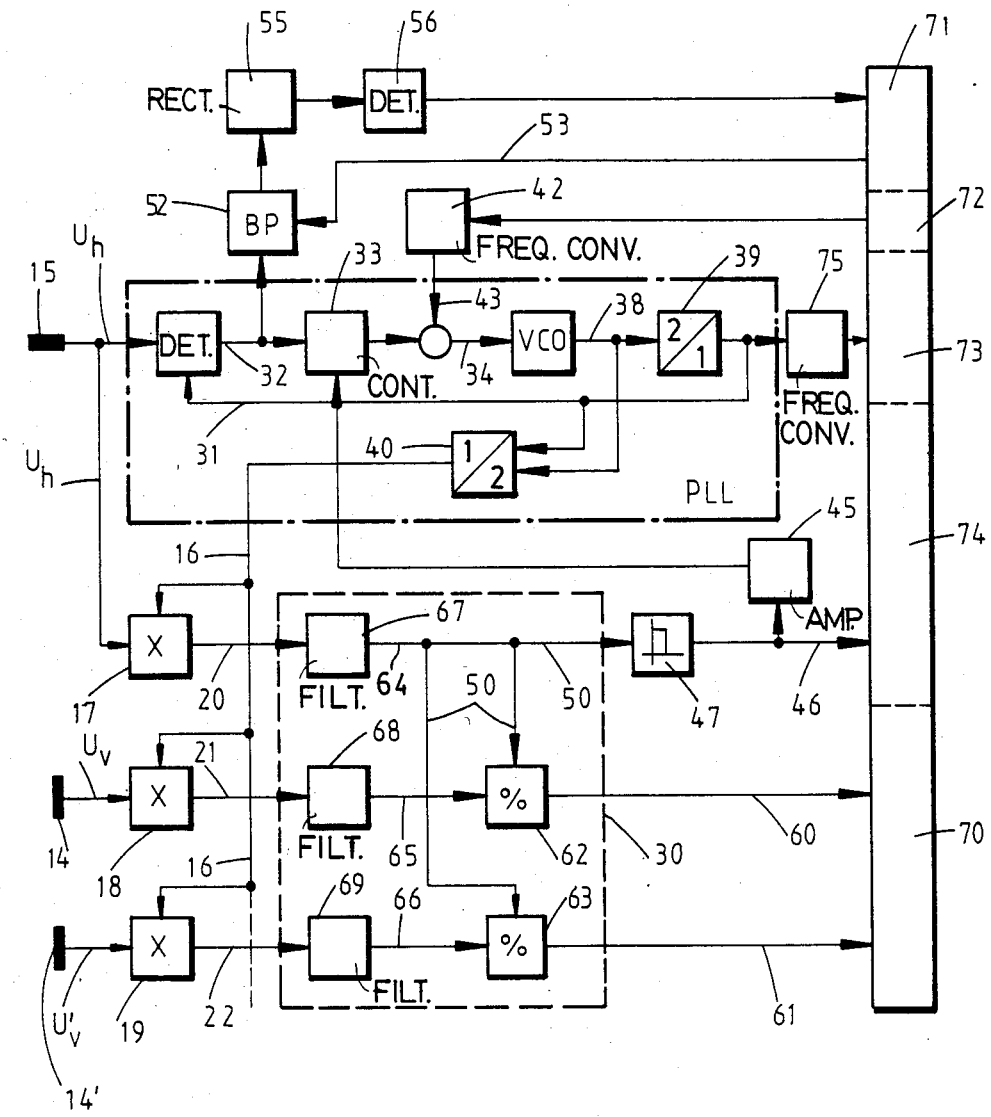
FIG. 2 is a block diagram showing a more detailed version of the PLL, and a processing circuit for the demodulated sensor signals.

FIG. 2 is a block diagram illustrating a more detailed version of the PLL, and an embodiment of a processing circuit 30 for the demodulated sensor signals 20 and 21. The PLL loop within the dash-dotted line has at its input end a phase-sensitive detector PSD to multiply the sensor signal $U_h$ by a PLL signal 31, which in the PLL is fed back and phase-shifted by 90° relative to $U_h$, in order to generate a phase-difference signal 32. Contained in the low-frequency range of the phase-difference signal 32 are signal portions that are proportional to the frequency or phase difference between the PLL signal 31 and $U_h$.

A control unit arranged behind the PSD interprets the phase difference of the signal 32 in the low-frequency range and generates a control voltage 34 for a voltage-controlled oscillator VCO. The control unit 33 reduces the phase differences of the control voltage 34 until the phase difference or control unit difference is reduced to zero. This process is generally termed synchronization. In this condition, the PLL signal 31 is shifted through 90° relative to the input signal, $U_h$, of the PSD.

The control unit is characterized by its amplification and frequency response. The harmonic content of the phase detector output signal makes a low-pass filter necessary. This is achieved by using a control unit with integral behavior (I control unit); if desired, a PI control unit or a $PT_1$ control unit may be employed. The setting parameters are dictated by the requirements of band width (response time).

For demodulating the sensor signals $U_h$, $U_v$ or $U_{v'}$, phase coincidence is required between the demodulation signal 16 and the sensor signals, for which purpose the PLL signal must be shifted through 90°. To this end the VCO is designed to have rectangular vibrations of at least twice the PLL frequency. The PLL generates besides the PLL signal, a demodulation signal 16 derived from the output signal 38 of the VCO, the PLL signal, and the two frequency dividers 39 and 40. From the output signal 38 of the VCO, coupled frequency dividers 39 and 40 are then used to generate the respective PLL signal 31 and the demodulation signal 16 that are phase-shifted 90° relative to one another. The coupled frequency dividers used to generate signal 16 may be two J-K master-slave flip-flops 39 and 40 connected in series. The first of the flip-flops divides the output signal 38 from the VCO into a signal 31 having half the frequency of signal 38 and shifted through 90°. The second flip-flop 40 then shifts the output signal 31 of the first flip-flop through 90° generating the demodulation signal 16.

The demodulation signal 16 generated in the manner just described is invariably synchronous in phase and frequency with the sensor signals and can be changed to various frequencies, provided that the sensors 15, 14, 14' receive and generate, respectively, mixed signals of various frequencies. The PLL circuit serves a function comparable to that of a bandpass filter, the mid-frequency of which is given by the free-running frequency of the VCO, and its characteristic by that of the control unit 33 in the low-frequency range. In this manner, using a frequency changer 42, the free-running frequency of the VCO can be changed and the mid-frequency of the bandpass characteristic be shifted accordingly, via an offset voltage 43 fed by the frequency changer, such that various carrier frequencies can be selected from among the sensor signals. This is an important consideration especially when along its route, the vehicle must negotiate shunts or change routes. In order to achieve synchronization when changing the frequency of the PLL, an amplification changer 45 can be used to change the amplification of the control unit 33 that the lock-in range or the bandwidth of the PLL is widened. The amplification changer 45 is driven automatically by the output signal 46 of a threshold detector 47, which monitors the demodulated and lowpass-filtered signal 50 of the sensor 15 for the horizontal field component. If the demodulation signal 16 is not synchronous with the sensor signal, the signal 50 will drop below the accordingly designed level of the threshold detector 47 to trigger a signal 46 causing the amplification change circuit 45 to decrease control unit amplification. When synchronization has been achieved, the signal 50 will exceed the given level, causing the amplification changer to be reversed to a high position.

The output signal 32 of the PSD can be utilized for monitoring the PLL circuit, redundant guide cable frequencies, and shunt frequencies. Provided for this purpose is bandpass filter 52, the frequency of which can be changed using a drive signal 53 and the output of which is successively routed to a rectifier 55 and a threshold detector 56. This is to monitor the presence of parallel frequencies, the approach of junctions, etc.

For interpretation of the sensor signals 20 to 22, circuitry 30 adapted to the crossed-antenna arrangement is provided to generate the control signals 60 and 61 by dividing signals derived from various field components. For this purpose, dividing circuits 62 and 63 are provided, the input signals to which are D.C. signals 64 to 66, which are proportional to the sensor voltages $U_h$, $U_v$, $U_{v'}$ and which are generated by lowpass-filtering the demodulated signals 20 to 22. Each sensor signal is assigned a lowpass filter 67, 68 or 69. The deviation signals 60 and 61 are thus formed independently of one another, making it possible, by using several vertical component scans, to provide a partially redundant system with no more than one horizontal scan. The deviation signals 60 and 61 are routed to a steering system 70 to guide the vehicle. Provided also are display and control units 71 to 74 to monitor, indicate, or control synchronization, frequency, and parallel frequencies. The PLL frequency at any moment can be displayed using a frequency counter 75.

Figure 3:
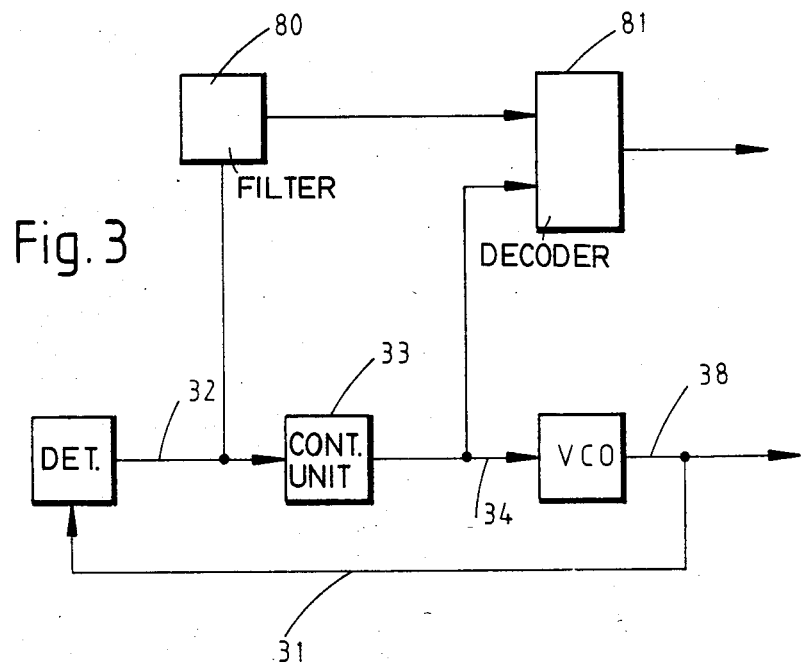
FIG. 3 is a block diagram showing an alternative circuitry for receiving information transmitted through the guide cable.

The circuitry of FIG. 2 is also suitable for receiving information transmitted through the guide cable, if these are contained in the sensor signal $U_h$, following amplitude, frequency, or phase modulation. For this purpose, the output signal 32 (FIG. 3) of the PSD can be routed, through a lowpass filter 80, and the output signal of the control unit 33 can be applied directly, to an information decoder 81 constructed of simple logic components.

This invention has been shown and described in preferred form only, and by way of example, and many variations may be made in the invention which will still be comprised within its spirit. It is understood, therefore, that the invention is not limited to any specific form or embodiment except insofar as such limitation are included in the appended claims.

We claim:

1. Apparatus for guiding a trackless vehicle along a conductor, defining a vehicle path, carrying an A.C. current, the apparatus comprising:

at least two sensors for detecting the magnetic field emanting from the conductor and producing output signals in response thereto, and electronic circuitry for providing deviation signals, used to guide the vehicle, said circuitry including a phase-locked loop (PLL), the PLL including a phase-sensitive detector (PSD), a voltage-controlled oscillator (VCO), and a control unit for receiving the output of the PSD and transforming it into a control voltage, the control voltage being applied to the VCO, the VCO generating a rectangular output signal equal to $2^n$ times the frequency of the PLL, the PLL including a divider circuit for dividing the VCO output signal by $2^n$, and a frequency divider for simultaneously generating a demodulation signal shifted through 90°, means for applying the output signal of one of the sensors to the input of the PLL, means for demodulating the output signals of the sensors, and means for applying the output of the PLL to the demodulating means.

2. Apparatus as defined in claim 1 wherein one of the sensors detects the horizontal component of the magnetic field and another sensor detects the vertical component, and the output signal of said one sensor is applied to the input of the PLL.

3. Apparatus as defined in claim 1 including a frequency changer, driven externally of the PLL, for changing the free-running frequency of the VCO.

4. Apparatus as defined in claim 1 including a frequency counter, and means for routing the VCO and PLL signals to the frequency counter to monitor the PLL frequency.

5. Apparatus as defined in claim 1 wherein the control unit exhibits integral response.

6. Apparatus as defined in claim 1 including a bandpass filter for receiving the output signal of the PSD, and a rectifier and threshold detector for receiving the output of the filter for simultaneously monitoring other frequencies contained in the sensor signal applied to the PLL.

7. Apparatus as defined in claim 1 wherein one of the sensors detects the horizontal component of the magnetic field and another sensor detects the vertical component of the magnetic field.

8. Apparatus as defined in claim 1 wherein one of the sensors detects the horizontal component of the magnetic field and at least two of the sensors detect the vertical component of the magnetic field.

9. Apparatus as defined in claim 8 wherein one of the sensors detects the horizontal component of the magnetic field and another sensor detects the vertical component of the magnetic field, and including a threshold switch for generating a level monitoring signal in response to the output signal from the sensor which detects the horizontal component of the magnetic field.

10. Apparatus as defined in claim 9 including an amplification control for receiving the level monitoring signal and controlling the amplification of the control unit in response thereto.

11. Apparatus as defined in claim 1 including an information decoder for receiving the output signals of the PSD and the control unit.

* * * * *